United States Patent [19]

Coruzzi

[11] 4,009,846
[45] Mar. 1, 1977

[54] TAPE RECORDER DRIVE SYSTEM

[76] Inventor: Orlando Coruzzi, Viale Monte Nero, 57, Milan, Italy

[22] Filed: June 27, 1975

[21] Appl. No.: 591,232

[30] Foreign Application Priority Data
Jan. 7, 1974  Italy ..........................24678/74
Mar. 26, 1975  Italy ..........................21706/75

[52] U.S. Cl. ....................242/201; 242/208; 74/665 R
[51] Int. Cl.² ........................G03B 1/04; G11B/15/32
[58] Field of Search .........242/200–202, 204, 67.4, 205–208; 74/665 R, 665 Q

[56] References Cited
UNITED STATES PATENTS

| | | | |
|---|---|---|---|
| 1,846,004 | 2/1932 | Green ................................ | 242/205 |
| 2,604,271 | 7/1952 | Moomaw ............................ | 242/205 |
| 2,611,283 | 9/1952 | Askren et al. ..................... | 74/655 Q |
| 3,865,331 | 2/1975 | Clever et al. ...................... | 242/199 |

Primary Examiner—Leonard D. Christian
Attorney, Agent, or Firm—Guido Modiano; Albert Josif

[57] ABSTRACT

The invention relates to a drive for magnetic tapes, wherein the tape is driven in the fast rewind and fast forward modes off a reversible electric motor which is concurrently and constantly connected to two spindles wherearound the tape coils and decoils, and wherein a means is provided for automatically engaging for rotation the electric motor with that spindle which rotates in a direction such as to wind up the tape, and a friction clutch device which in the recording and playing modes compensates for the differential between the tape speed and the spindle speed as driven by the electric motor, whereas in the fast forward mode it locks automatically.

7 Claims, 5 Drawing Figures

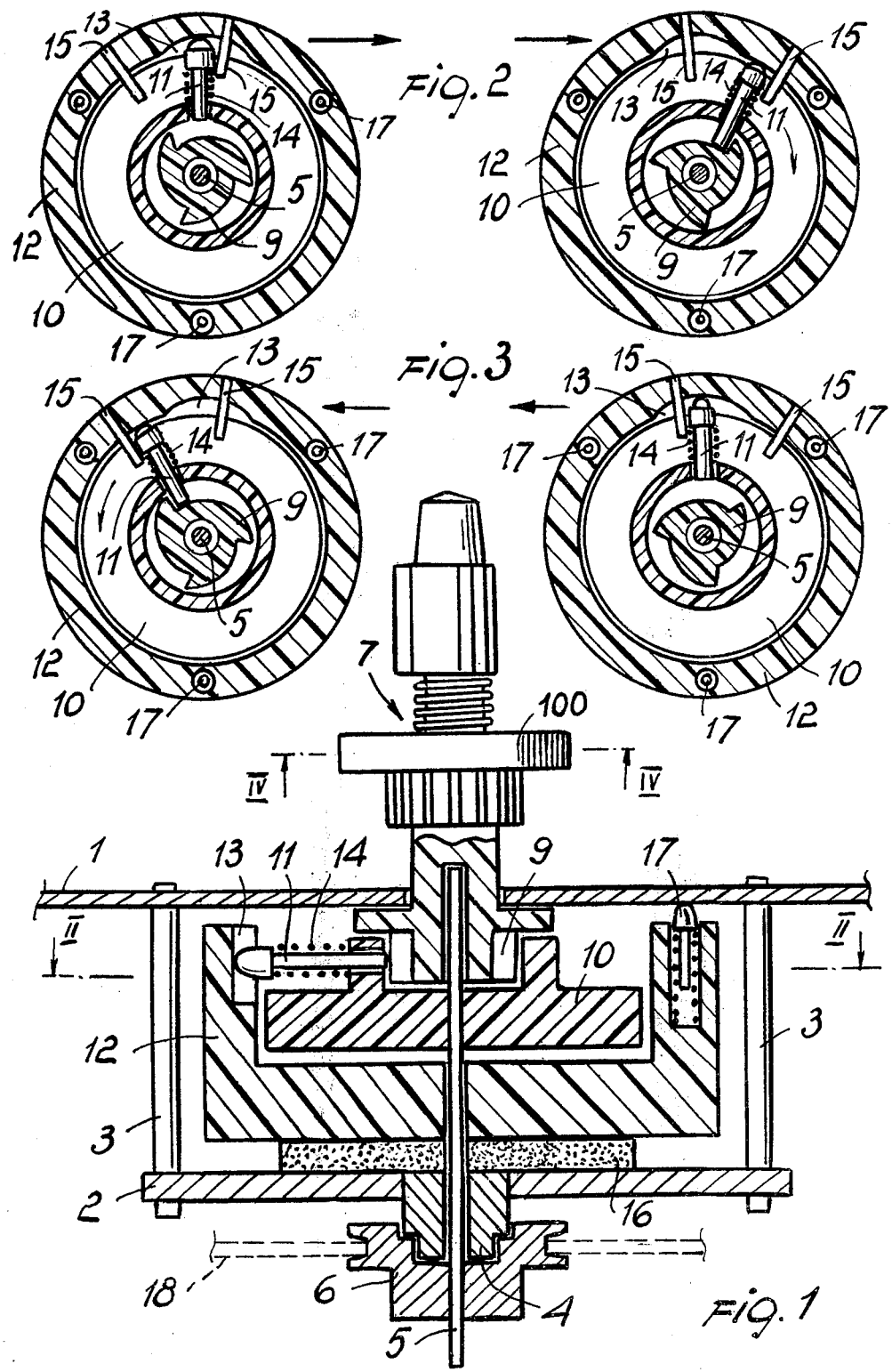

TAPE RECORDER DRIVE SYSTEM

BACKGROUND OF THE INVENTION

This invention relates to a drive suitable for use with the magnetic tapes utilized in small-size recording apparata, e.g. cassette tape recorders.

The magnetic tape is known to run in a tape recorder at a constant and pre-determined rate whenever the recorder is operated either in the recording mode or in the playing mode, whereas during fast rewinding or fast advancing the tape runs at a much higher rate. Furthermore, during the latter modes of operation, the tape moves in opposite directions, since in the fast forward or fast advance condition the tape is wound around the take-up reel, whereas in the rewind condition the tape is wound around the pay-out reel. Since all the moving parts inside a tape recorder of the medium or small size types are driven by a single electric motor operating at a substantially constant speed and rotating always in one direction, the prior art approach has been based upon the provision of manually operated and fairly complicated gear and lever systems for an appropriate conversion of the motion imparted by said motor. A detailed description of a conventional moving wheel and linkage system is not provided herein, as such systems are well known to the expert and would involve an extensive discussion. It should suffice to mention that, for example, the motor is connected through a drive belt to a flywheel affixed coaxially to a stub shaft the peripheral speed whereof exactly matches the desired rate of advance of the tape when being recorded or played. Said flywheel, in turn, contacts movable wheels which, according to their positioning as determined manually by depressing the fast forward or rewind keys or buttons, bring the flywheel in further contact with disc elements which are coaxial to the drive spindle wherearound the tape coils and decoils. Said wheels are sized and arranged such that the rotational movement imparted by the flywheel to said drive spindles has a speed much higher than said stub shaft, and moreover reverses its direction depending on whether it is transferred to the forward shaft or rewind shaft.

It will be apparent that all this involves of necessity the manufacture and installation of an appreciably high number of precision matched components, which have to be very accurately assembled because any unreliable contact between the wheels would reflect in the magnetic tape coming to a stop. Consequently, the recorder manufacturing cost is high and the manufacturing process thereof long and complex. Another drawback is to be found in the increased overall dimensions resulting from such drives, and grows even more serious when such drives are used in small-size recorders equipped with only one motor. It should be noted, moreover, that the controlling of the recorder, by means of keys or buttons which have to produce a shift of the mechanical linkage by overcoming certain resistances, may be a source of inconvenience because an appreciable physical effort must be exerted.

OBJECTS OF THE INVENTION

It is an object of this invention to provide a novel drive that obviates the drawbacks mentioned above, and is designed such as to bring about a simplification and minimization in the recorder internal parts requirement.

It is a further important object of the invention to provide a drive that ensures reliable operating conditions without requiring regular servicing.

Another object of the invention is to provide a drive which is quite inexpensive and easy for the industry to manufacture.

SUMMARY OF THE INVENTION

These and other objects, such as will become apparent hereinafter, are achieved by the inventive drive, said drive being characterized in that it comprises: a reversible electric motor; a pair of shafts being supported by the recorder frame and pivotally associated to two spindles whearound a magnetic tape coils and decoils and fixedly associated to pulleys; drive belts continuously connecting said reversible motor to said pulleys and to a drive or capstan member which drives the magnetic tape in the recording and playing modes of the recorder; mens engaging for rotation each of said shafts with a respective one of said spindles when said spindle rotates in the same direction as the tape being wound around that same spindle, each of said shafts being otherwise mounted for free idle rotation about its respective spindle; and a friction clutch device intervening between the spindle whearound the tape is wound in the recording and playing modes and said means for engaging that same spindle to its respective shaft, said friction clutch device being provided with locking members adapted to stop the sliding action between said spindle and its respective shaft when that same spindle is rotated faster for a quick winding of the tape.

DESCRIPTION OF THE DRAWINGS

Further features and advantages of the invention will become apparent from the following description of a preferred embodiment thereof, illustrated, by way of example and not of limitation, in the attached drawings, where:

FIG. 1 is a side sectional view of an assembly according to the invention;

FIG. 2 is a sectional view of assemblies according to the invention taken along the line II—II of FIG. 1, their internal components being represented with the tape advancing through the recorder;

FIG. 3 shows again assemblies making up the subject drive but positioned for advancing the tape in the opposite direction to FIG. 2;

DESCRIPTION OF THE PREFERRED EMBODIMENT

Figure 4:
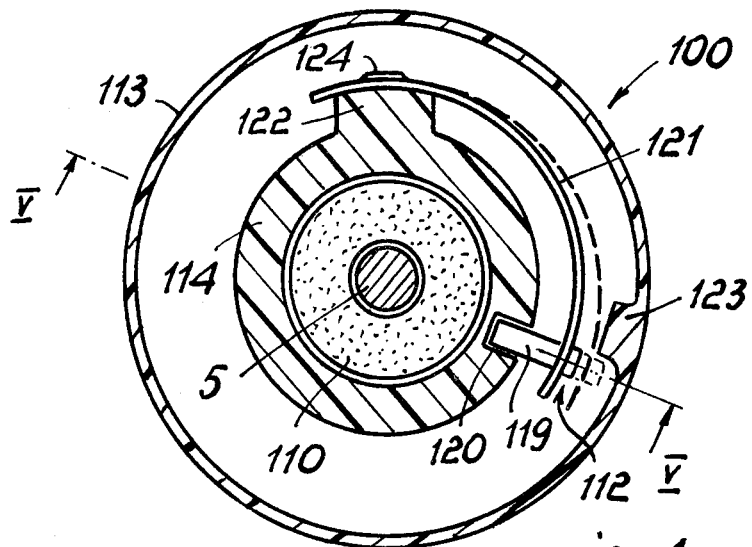
FIG. 4 is a sectional view taken along the line IV—IV of FIG. 1.

With reference to the drawings, the drive of the invention is mounted to the supporting or main frame of the recorder, and more particularly to a plate 1, adjacently whereto the magnetic tape is made to run, e.g. within a cassette. As shown in FIG. 1, there is provided a base disc 2 at each of two drive spindles 7, whearound the tape coils and decoils, said base disc being spaced from the plate 1 by uprights 3 and affixed centrally to a bushing 4, wherethrough a shaft 5 is inserted rotatably. The latter is, at its outer and farther portion from the plate 1, integral with a pulley 6 rotatably seated on the bushing 4, whereas at its opposite portion next to the plate 1, it is pivotally associated to a drive spindle 7 wherearound the magnetic tape coils and decoils. The drive spindle 7 in this embodiment is of the type which enters specially provided holes in the cassette. According to the invention, the spindle 7 terminates at its bottom end with substantially radial notches or teeth 9 which seat within a disc 10, coaxial to and integral with the shaft 5 and thus rotating together with the pulley 6. The disc 10 engages with a locking or tripping member which is effective to lock together, when there occurs a set of conditions as discussed hereinafter, that same disc 10 and the teeth 9 in the drive spindle 7. Said locking member is, in this embodiment, a plunger 11 movable in an axial direction with respect to the disc 10 which the plunger penetrates to a position such as to interfere, when pushed centripetally, with the teeth 9. The radially outermost portion of the plunger 11 is biased by camming means comprising a cup member 12 coaxial to the disc and shaft 5 but disengaged with respect to the shaft 5. In detail, the cup member 12 is formed with a recess 13 which the plunger 11 can enter under the influence of a compression spring 14 which keeps the plunger 11 constantly in contact with the inner surface of the cup 12. The latter is not completely independent for rotation with respect to the disc 10: it is in fact provided with locking elements, which in this embodiment take the form of pins 15 so arranged as to interfere laterally with the plunger 11 and define a certain angular play wherewithin the disc 10 and cup 12 may be freely displaced. The cup 12 tends to displace with respect to the disc 10 such as to oppose the rotary movement of the latter. The cup 12 is actually retained through a friction member to the stationary frame of the recorder. In this embodiment, said friction member is a felt member 16 mounted between the base disc 2 and the bottom portion of the cup 12 which, as shown in FIG. 1, is pressed against the felt 16 by spring biased pins 17 intervening between the cup and the lower face of the plate 1. The pins 17 may be arranged in any of several ways. In this embodiment, there are provided three such pins at 120° from each other, at the upper edge of the cup 12.

In FIG. 1, there is shown, moreover, a first belt 18 connecting the two pulleys 6, i.e. one for each shaft 5 coaxial to a drive spindle 7, together and to the recorder flywheel which, in turn, is driven through a second belt by an electric motor of the reversible type and rotating at a substantially constant speed and designed in conformity with the current practice for the art.

With reference to FIGS. 2 and 3, it should be further noted that the pins 15 are arranged differently at the two magnetic tape drive spindles; i.e. one pin 15 is always inserted in a substantially central area of the recess 13, whereas the other pin 15 is located outside the recess 13 in a position which can only be reached by moving in the same direction as the drive spindle 7, as the latter rotates to wind the magnetic tape.

Figure 5:
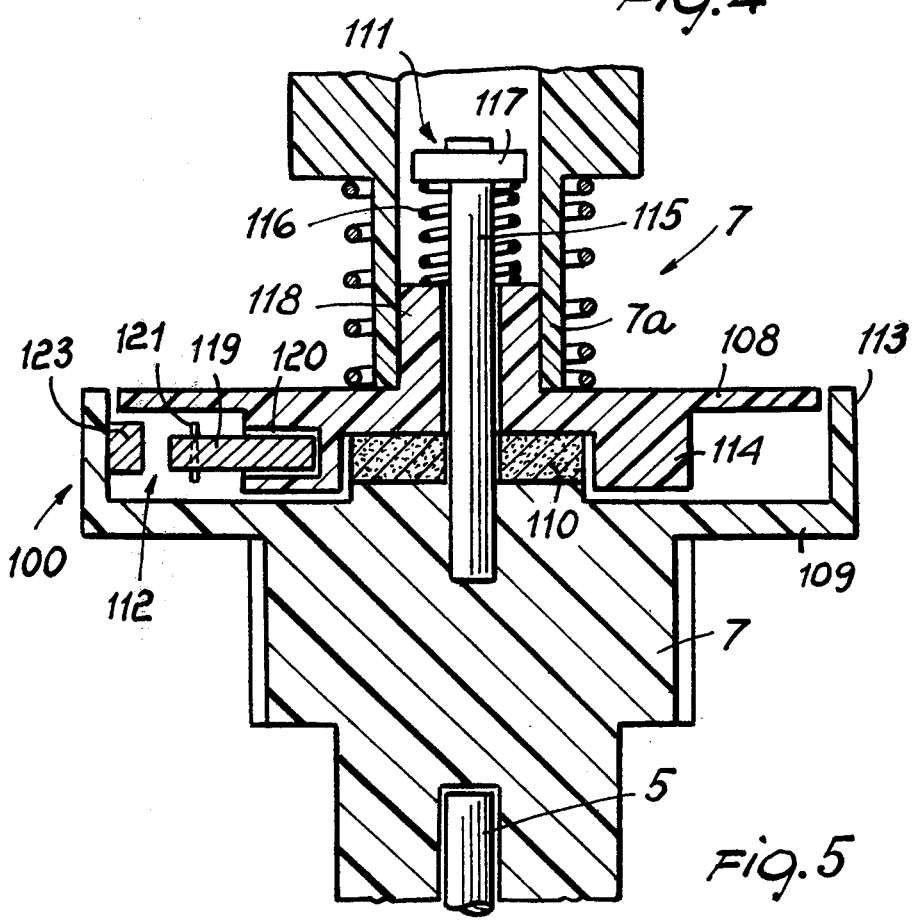
FIG. 5 is a sectional view of the clutch device according to the present invention taken along the line V—V of FIG. 4.

The invention provides also a clutch device designated generally with the numeral 100 and positioned at the spindle 7 driving the take-up reel, whereon the magnetic tape coils as it is recorded, played or run fast forward. The clutch device 100, as FIGS. 4 and 5 show clearly, comprises essentially: an upper disc 108, coaxial to the upper portion 7a of the spindle 7 for rotation therewith; a lower disc 109, coaxial to and integral with the lower portion 7b of the spindle 7; a friction plate 110 intervening between said discs, 108 and 109; rotary slide-action connecting means of the upper disc 109, designated generally with the numeral 111; and locking members 112 adapted to prevent the discs from rotating relatively to each other when the spindle 7 is rotated rapidly in the fast forward mode.

In detail, the lower disc 109 is provided with a central area acting directly on the friction plate 110, and a peripheral rim portion 113 arranged substantially perpendicular to the main extension plane of the disc 109. The upper disc 108 extends substantially within that space portion which is defined by the rim 113, and is also provided with a central area directly contacting the friction plate 110. Said area is delimited by an annular shoulder 114 at an intermediate portion of the upper disc 108, and the shoulder projects toward the lower disc 109, being separated therefrom. The rotary slide-action connecting means of the discs 108, 109 are essentially a pin 115 integral with the lower portion 7b of the spindle 7, whereto it is coaxial. The pin 115 is pivotally inserted within the upper portion 7a of the spindle 7, whereon it is acting through a compression spring 116 coaxial to the pin 115 and retained at one end by a widening 117 in the pin 115, and at the other end by a centrally located projection 118 of the upper disc 108. The locking members 112 are located between the upper disc 108 and the lower disc 109 within the space bound by the rim 113 and annular shoulder 114. The present locking members 112 comprise a radially movable element in the form of a pin 119 inserted partially in a seat 120 formed laterally in the shoulder 114. The pin 119 engages with the upper disc 108, more precisely with the shoulder 114, through flexible means comprising a reed 121 engaged on one end with a projection 122 of the shoulder 114 and on the other with the pin 119. The latter is oriented radially and in its rest position is in a condition of deepest insertion into the seat 120. From the rim 113 a block 123 projects and extends radially so as not to interfere with the pin 112 when at rest or only slightly biased, but such as to interfere with that same pin when the latter is in its position of maximum extension in a centrifugal direction. In FIG. 4, there is shown the pin 119 in its rest position and, in dotted lines, the pin 119 in its operating position. The engagement of the reed 121 by the projection 122 may be ensured, for example, by inserting and hot moulding a pin 124 in a hole in the reed 121, and the engagement of the reed with the pin 119 may be provided through a bifurcated end portion formed in the reed, possibly closed by a plugging element.

The drive according to the invention operates as follows. In either assemblies the belt 18 rotates the pulley 6 which in turn drives the shaft 5 and the disc 10. Initially, the cup 12, thanks to the clutch device, tends to remain at rest and a relative angular displacement occurs between the disc 10 and cup 12. The plunger 11, rotating integral with the disc 10, rubs with its radially outermost end against the inner surface of the cup 12 not yet driven into rotation, the above until the plunger 11 interferes with a pin 15. At this point, the cup 12 is also driven in rotation by overcoming the resistance opposed by the friction element represented by the felt 16 compressed by the pins 17. The shifting of the plunger 11 with respect to the cup 12, however, allows the plunger 11 to change its axial position. Therefore, if the pulley 6, and accordingly the shaft 5 and disc 10, rotate with the tape being wound on the drive spindle 7 whereto they are coaxial, the plunger 11 positions itself close by a pin 15 located outside the recess 13 formed in the cup 12. The plunger 11 is then forced to shift axially and insert itself between the teeth 9 projecting from the lower end of the adjacent drive spindle 7. Thus, the cup 10 is caused to rotate integrally with said drive spindle 7, and the entire assembly, including the pulley 6, shaft 5, disc 10, plunger 11, and said drive spindle 7, rotates as a single piece. The above occurs, for example, within the assembly to the right of FIG. 2 and in the assembly to the left of FIG. 3, both of them being driven such as to wind the magnetic tape around their respective drive spindles. When the direction of rotation of the first belt 18 is reversed by said reversible motor, e.g. in order to switch from fast forward to fast rewind, the disc 10 and cup 12 are once more mutually disengaged for a given distance until the plunger 11 starts to interfere with the pin 15 located inside the recess 13. Since the plunger 11 is being acted upon by the compression spring 14, it quickly enters the recess 13 by moving radially in a centrifugal direction; thereby it withdraws from the notches 9 thus releasing the disc 10 with respect to its drive spindle 7.

By arranging, as shown in FIGS. 2 and 3, two such assemblies which differ in what concern the position of the pins 15, i.e. an assembly with the pin outside the recess 13 positioned at an angle counterclockwise with respect to the recess, and the other assembly with that same outside located pin to the right, a condition is reached whereby when a spindle 7 revolves about its own axis, thus driving the tape, the other spindle remains idle. In this way, any interference or overriding in the actions by the two drive spindles is effectively prevented, and it becomes possible to interconnect the two pulleys 6 with a single belt 18, which is also connected to a reversible motor, i.e. motor capable of reversing its direction of rotation under the control of a suitably arranged switch. The connection between the pulleys and motor may obviously be effected in several other ways. For example, it may be effected by connecting the first belt 18 to a first idler wheel mounted coaxial to the recorder flywheel and capstan which drives the magnetic tape during recording or playing. The flywheel, and accordingly said idler wheel and capstan, would then be rotated by a second belt connecting the flywheel to a second idler wheel coaxial to the reversible motor own axis. Obviously, as mentioned hereabove, the diameters of such rotary components will have to be selected so as to obtain the desired operating speed for the recorder. It will then be necessary, among others, that said first idler wheel, coaxial and integral to the capstan, be of a diameter which is much larger than the capstan, thereby imparting to the first belt 18 and accordingly to the pulleys 6 and tape, in the fast rewind and fast forward modes, a speed much higher than the speed imparted by said capstan to the tape during the recording or playing thereof. In the recording or playing modes, when it is the capstan that determines the rate of advance of the magnetic tape, there will occur a differential between the speed imparted to the tape and the speed of the pulley 6, and accordingly of the drive spindles 7, since the first belt 18 is being driven constantly.

In fact, in the recording or playing modes, when the rate of advance of the magnetic tape is strictly dependent on the capstan, the tape coils around the spindle 7 slowly and smoothly. The shaft 5 is instead constantly rotated by the pulley 6 at the requisite speed for fast forward. The differential between the speed of the shaft 5, and accordingly of the lower portion 7b of the spindle 7, and the speed of the magnetic tape, and thus of the upper portion 7a of the spindle 7, is compensated for by the clutch device 100 which allows a degree of slippage between said two portions of the spindle. The locking members 112 provided by the invention do not inhibit this slippage since the angular velocity of the upper portion 7a of the spindle 7, wherewith they are engaged, is small and does not produce a sufficient centrifugal force acting on the pin 119 to expand it radially by overcoming the resistance by the reed 121, until the block 123 is interfered with.

In the fast forward mode, the magnetic tape coils around the spindle 7 at the speed determined by the pulley 6 and shaft 5. It thus becomes necessary for the motion to be transmitted continuously by the lower portion 7b of the spindle 7 to the upper portion 7a of the spindle without slippage. This effect is ensured by the locking members 112. In fact, the angular velocity of the upper portion 7a of the spindle 7 is much higher than that considered for recording and playing, and the centrifugal force acting on the pin 119 is such as to flex the reed 121 and bring the pin 119 in side contact with the block 123. Thus, any slippage between the upper disc 108 and lower disc 109 is effectively prevented.

The invention achieves the objects intended. In fact, all the linkages and gearing have been eliminated which provided for the reverse rotation of a constant direction type of electric motor, as well as to transmit separately to either drive spindles the rotational movement of that same motor. Along with such mechanical components there is eliminated every manual effort, since it is now required that pushbuttons be actuated only for reversing the motor direction of rotation. Furthermore, the drive according to the invention is highly competitive from a merely economical point of view and easy to produce with mass techniques, being simple in construction and comprising only elements quickly available on the market. The application of this drive to a recording apparatus tends to greatly reduce the overall dimensions and weight of the apparatus, which is the more advantageous where the recorder is of the compact design type.

The invention is susceptible to numerous variations and modifications, all of which are intended to fall within the scope of the present invention. Thus, for example, the camming means may be practiced in various ways: they may be replaced with a projection gradually extending in a centripetal direction from the periphery of the cup, so that the latter would no longer include the recess 13. The locking members may also be designed and arranged differently. The locking tooth, provided it is capable of ensuring the action described, may be practiced in any of several ways. The reed 121, moreover, may be replaced with a calibrated spring arranged coaxially to said pin. Furthermore, the stop blocks for the pin may be provided in any number and configuration. All the detail components may be replaced with other technically equivalent elements.

In practicing the invention, the materials and the dimensions employed may vary according to necessity.

I claim:

1. In a drive, particularly for use with magnetic tapes in small size recorders, with a recorder frame, a capstan member which drives the magnetic tape in the recording and playing modes of the recorder, pulleys, a reversible electric motor and drive belts continuously connecting said reversible motor to said pulleys and to said capstan member: a pair of shafts supported by said recorder frame, two spindles wherearound the magnetic tape coils and decoils, said shafts being pivotally connected with said spindles to allow selectively free idle rotation of said shafts with respect to said spindles, said pulleys fixedly connected to said shafts, ; means engaging for rotation each of said shafts with a respective one of said spindles when said respective spindle rotates in the same direction as the tape being wound around said respective spindle, and a friction clutch device arranged between said respective spindle wherearound the tape is wound in the recording and playing modes and said means for engaging said respective spindle to its respective shaft, said clutch device having locking members adapted to prevent the free idle rotatory relationship between said respective spindle and its respective shaft when said respective spindle is rotated faster for a quick winding of the tape.

2. A drive according to claim 1, wherein said means engaging for rotation each of said shafts with a respective one of said spindles, comprise at each spindle, camming means, a locking tooth rotating integrally with said shaft and engageable with said camming means and with said spindle but providing an angular play with respect thereto, a friction member between said camming means and the recorder frame, said camming means being displaced angularly in a direction opposite to the direction of rotation of said shaft under the influence of said friction member tending to retain said camming means with respect to the recorder main frame.

3. A drive according to claim 2, wherein said spindles have a bottom portion having notches and teeth formations projecting therefrom and wherein said locking tooth is radially shiftable with respect to said respective spindle and camming means so that the engagement of each locking tooth with said respective spindle is effected by inserting said locking tooth between said teeth formations, said camming means and said angular play defined by said camming means with respect to said shaft being sized such as to permit full insertion or withdrawal of said locking tooth into and from said notches or teeth depending on said angular displacement of said camming means.

4. A drive according to claim 1, wherein said locking members of said clutch device comprise at least one radially movable element and spring means biasing the centrifugal force acting on said movable element during rotation of said clutch device, the radial displacement of said element determining the locking of said clutch device.

5. A drive according to claim 1, wherein said clutch device comprises: an upper disc integral for rotation with an upper portion of said spindle; a lower disc integral with a lower portion of said spindle, said lower spindle portion being connected to said means engaging for rotation said shafts with said spindle, a friction plate arranged between said upper disc and said lower disc; and locking members comprising a movable pin in a radial direction spring means biasing said pin in the direction of motion thereof and engaged on one side with said pin and on the other side with one of said discs, and at least one detent member integral with the other disc and adapted to interfere laterally with said pin when the latter is urged radially outwards under the influence of the centrifugal force created by the quick rotation of said spindle.

6. A drive according to claim 5, wherein said upper portion of said spindle has a seat in which said pin is partially inserted , and said detent member is a block projecting in a radial direction from an inner face of a rim integral with said lower portion of said spindle said rim limiting the radial stroke of said pin in a centrifugal direction.

7. A drive according to claim 5, wherein said flexible means is a resilient reed flexing under the action of the centrifugal force acting on said pin.

* * * * *